(No Model.)

J. J. ADGATE.
Furniture Caster.

No. 237,717. Patented Feb. 15, 1881.

WITNESSES:
Charles V. Adgate
Jam. Fro. Smith

INVENTOR:
Joseph J. Adgate
BY Jam. Fro. Smith
his ATTORNEY

UNITED STATES PATENT OFFICE.

JOSEPH J. ADGATE, OF NEW YORK, N. Y.

FURNITURE-CASTER.

SPECIFICATION forming part of Letters Patent No. 237,717, dated February 15, 1881.

Application filed December 31, 1880. (No model.)

*To all whom it may concern:*

Be it known that I, JOSEPH J. ADGATE, of the city of New York, in the county and State of New York, have invented a new and useful Improvement in Furniture-Casters, of which the following is a full, clear, and exact description, reference being had to the accompanying drawings, making a part of this specification, in which—

Figure 1:
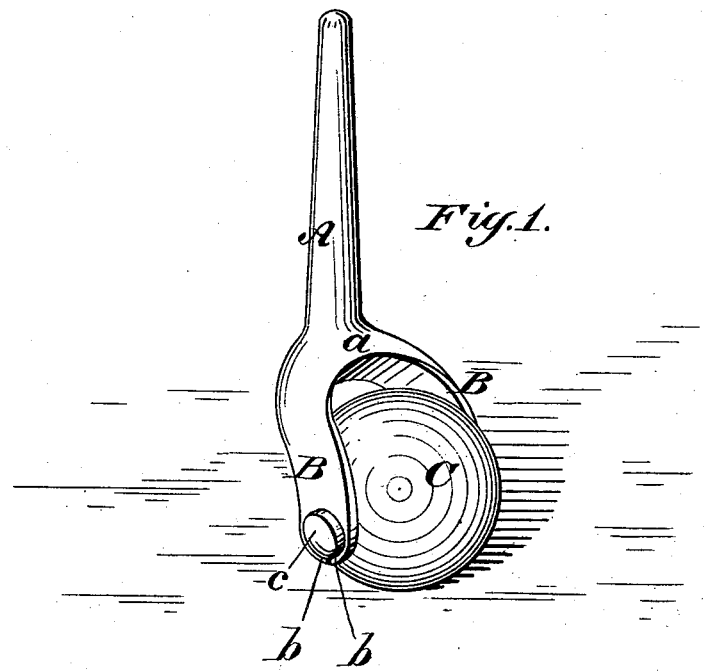
Figure 2:
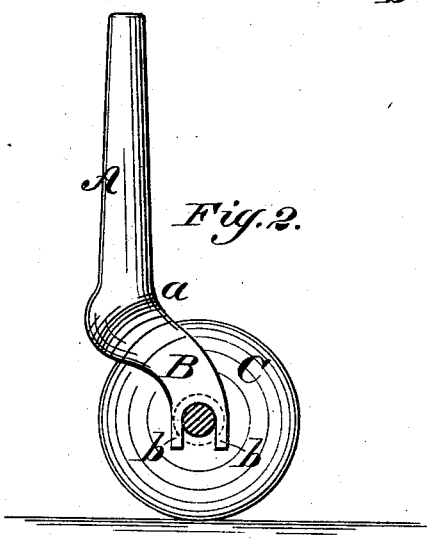
Figure 3:
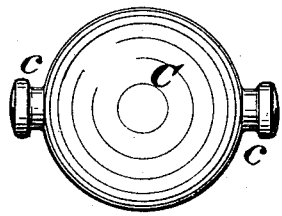

Figure 1 is a view in perspective of the caster. Fig. 2 is side view of the shank ready for the insertion of the ball. Fig. 3 is a view of the ball, showing both trunnions ready to be placed in the arms of the shank.

My invention relates to the method of attaching the spherical wheel to the shank of the caster; and the object is to secure a connection which shall be cheap, convenient, attractive, and durable, which can be applied to spheres or other wheels made of glass or other suitable material, with the bearings so arranged as to get the best possible effects as to the strength and durability of the arms of the shank, and at the same time secure the sphere or wheel in place without heading down or battering the journal on which the same revolves. I attain these objects by the mechanism illustrated in the accompanying drawings, which I proceed to describe as follows:

I construct a shank, A, of iron or other proper metal, rounded at the upper end, so as to revolve easily in bearings in the leg of the furniture or other device to which it may be attached. The lower end is divided at *a* into two arms, B B, which are bent into the form of a semicircle, and at the same time turned at an angle with the perpendicular portion of the shaft A, and the lower end of each arm is again divided, so as to make a bearing between two points, *b b*.

I construct a spherical ball, C, of glass or other suitable material, having on opposite sides, at the center, lugs or trunnions *c c*, of a size to insure strength sufficient to support the furniture or other device to which the caster is to be applied. If desired, this ball may be flattened slightly on the sides where the lugs are placed, as I do not confine myself to the exact form of a sphere. These lugs may be constructed with the outer ends larger than where they join the body of the ball, to prevent them from escaping the embrace of the arms when the caster is in use. The lower ends of the arms may be turned a little downward, so as to be perpendicular, or nearly so, when the caster is in use, thereby securing a better bearing and greater durability.

The ball or wheel C is secured in position by bending the points *b b* around the lugs or trunnions *c*, so as to hold the ball in position.

I am aware that casters have been made with a divided shank with a sphere or wheel secured between them, and do not therefore claim that device, broadly.

I am also aware that casters have been made with spheres of glass and other substances in place of wheels, some of which have been made to revolve on journals passing through the spheres or wheels and some on lugs inserted into cavities or depressions in the surface of the spheres or wheels, none of which devices I claim as my invention. Neither do I confine myself to any special manner of connecting the shank to the furniture, as any of the ordinary methods known in the art may be used.

What I claim as my invention, and seek to secure by Letters Patent, is—

1. In a furniture-caster, a sphere of glass or other suitable substance provided with lugs or trunnions as bearings, having an enlargement at the end to prevent them from slipping from their bearings.

2. In a furniture-caster, in combination with a spherical wheel having lugs or trunnions as bearings, with enlarged ends, arms divided at the lower extremity into points, which may be bent around the smaller portion of the lugs or trunnions, so as to prevent them from slipping from their bearings.

JOSEPH J. ADGATE.

Witnesses:
CHARLES ADGATE,
SAM. TRO. SMITH.